No. 771,436. PATENTED OCT. 4, 1904.
R. A. MOORE.
TIME CIRCUIT CONTROLLER.
APPLICATION FILED SEPT. 10, 1903.
NO MODEL.
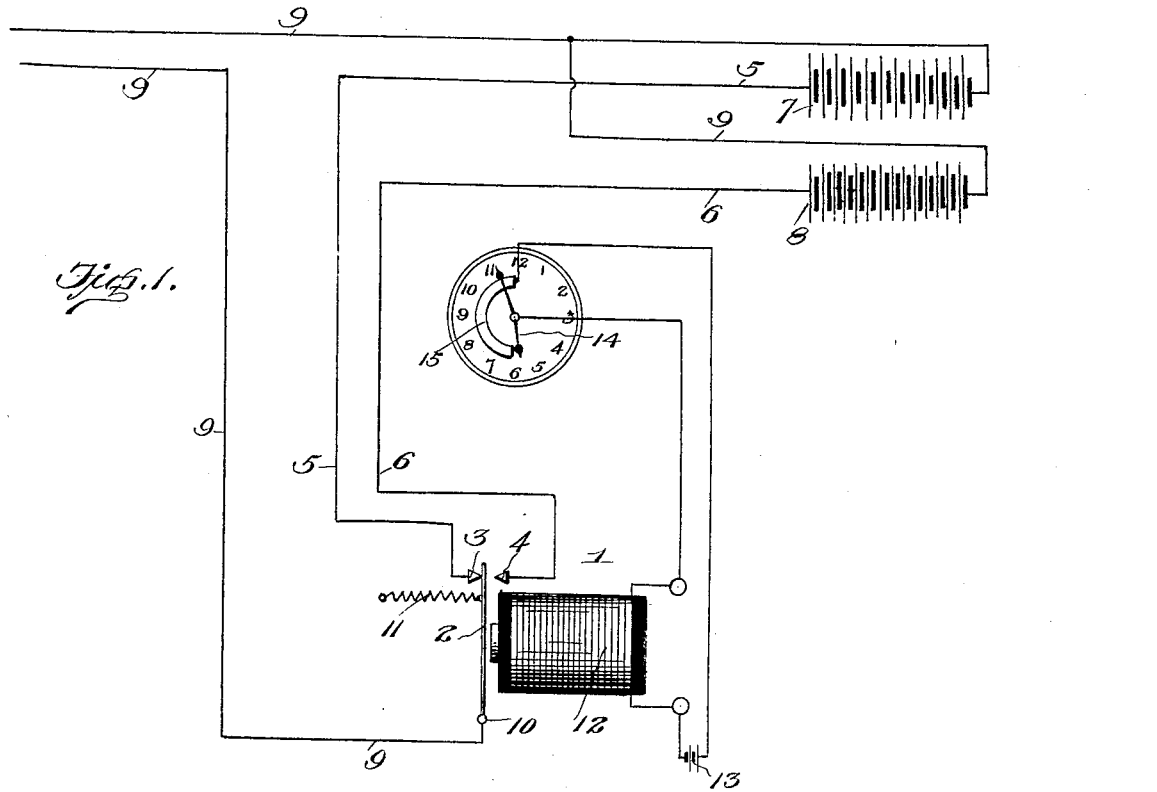
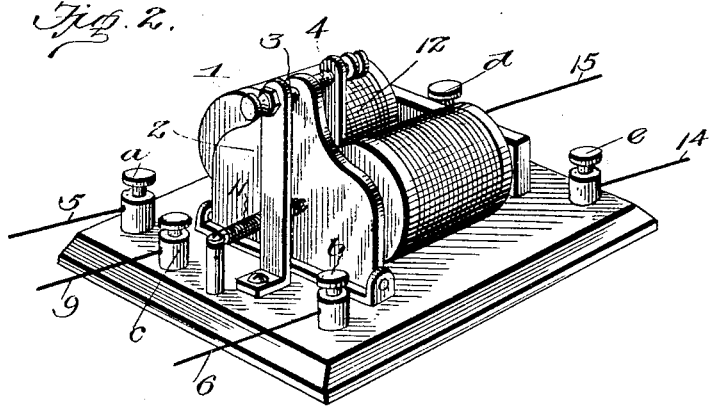
Witnesses
Inventor
R. A. Moore
By
Attorney No. 771,436.

Patented October 4, 1904.

UNITED STATES PATENT OFFICE.

ROBERT A. MOORE, OF HUNTSVILLE, ALABAMA.

TIME CIRCUIT-CONTROLLER.

SPECIFICATION forming part of Letters Patent No. 771,436, dated October 4, 1904.

Application filed September 10, 1903. Serial No. 172,618. (No model.)

*To all whom it may concern:*

Be it known that I, ROBERT A. MOORE, a citizen of the United States, residing at Huntsville, in the county of Madison and State of Alabama, have invented certain new and useful Improvements in Current - Controllers for Electric Generators; and I do declare the following to be a full, clear, and exact description of the invention, such as will enable others skilled in the art to which it appertains to make and use the same.

My invention is an improved current-controller for electric generators adapted to alternately connect generators to a line-circuit, so that one generator will be disused while the other is employed to furnish the line-current; and it consists in the construction and combination of devices hereinafter described and claimed.

The object of my invention is to combine with batteries or other electric generators for supplying line-current an electrically-operated switch and a time mechanism to control it to alternately connect the generators to the line, so that one of the generators will be disused while the other is at work.

A further object of my invention is to effect improvements in the construction of the switch employed in the practical operation of my invention.

In the accompanying drawings, Figure 1 is a diagram illustrating a practical embodiment of my invention. Fig. 2 is a detail perspective view of a relay-switch forming part of my invention.

In the embodiment of my invention here shown I employ a relay-switch 1, the armature 2 of which operates between two insulated contacts 3 4, which are respectively connected by conductors 5 6 to batteries or other electric generators 7 8. The latter are also each connected to one leg or wire of a line 9, the other leg or wire of which is connected to the armature 2, as at 10. A spring 11 is connected to the armature to cause it to engage the contact 3. The windings of the electromagnet 12 are connected to a local circuit, which includes a battery 13, the hour-hand 14 of a clock, and a conductor 15 on the clock-dial, and the length of which is here shown as coextensive with the distance between the hours "6" "12," corresponding with the movement of the hour-hand during six hours. Sliding contact is effected between the hour-hand and the conductor 15. The extent of the latter may correspond with any desired period of time, as will be understood. While the hour-hand is in contact with this conductor the local circuit will be closed, causing the electromagnet to be excited and the armature forming the switch element to break from the contact 3, and thereby cut out the battery 7 from the line and to engage the contact 4, and thereby connect the battery 8 with the line. When the hour-hand disengages the conductor 15, thereby breaking the circuit of the local battery, the spring draws the armature from the contact 4, thereby cutting out the battery 8 from the line-circuit, and keeps it in engagement with the contact 3, thereby reincluding the battery 7 with the line-circuit.

The relay is provided with suitable binding-posts *a b*, connected, respectively, to the contacts 3 4 for the attachment of the wires leading to the batteries or other generators 7 8, has a binding-post *c* for the attachment of the line-wire and binding-posts *d e* for the attachment of the wires of the local circuit, including the time mechanism and the battery 13.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

In combination with a working circuit having a pair of alternately-operating batteries each having one pole connected to one side thereof, a switch-armature connected to the other side of said working circuit, and electrodes between which the switch-armature operates and each connected to one pole of one of said batteries, of a time mechanism make and break comprising a fixed conductor and a traveling conductor, a spring to engage the switch-armature with one of the electrodes, and an electromagnet to engage the armature with the other electrode, and having its windings included in a local circuit with the conductors of the time mechanism make and break, substantially as described.

In testimony whereof I have hereunto set my hand in presence of two subscribing witnesses.

ROBERT A. MOORE.

Witnesses:
ED. DOUGHERTY,
H. HOWARD.